H. J. SANDERSON.
ELECTRIC SIGNAL.
APPLICATION FILED OCT. 8, 1917.
1,281,422.
Patented Oct. 15, 1918.
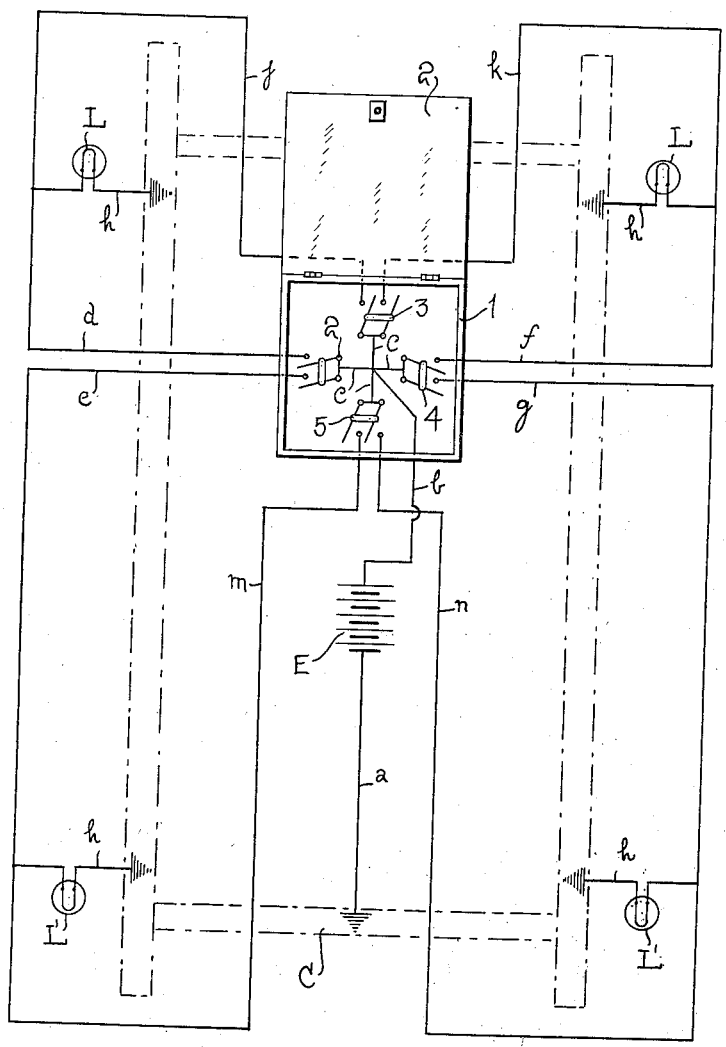
Inventor
H. J. Sanderson
By Watson E. Coleman
Attorney

UNITED STATES PATENT OFFICE.

HERBERT JOHN SANDERSON, OF PITTSBURGH, PENNSYLVANIA.

ELECTRIC SIGNAL.

1,281,422.

Specification of Letters Patent.   Patented Oct. 15, 1918.

Application filed October 8, 1917.   Serial No. 195,400.

*To all whom it may concern:*

Be it known that I, HERBERT J. SANDERSON, a citizen of the United States, residing at Pittsburgh, in the county of Allegheny and State of Pennsylvania, have invented certain new and useful Improvements in Electric Signals, of which the following is a specification, reference being had to the accompanying drawings.

This invention relates to certain improvements in electric signals and has relation more particularly to a system especially designed and adapted for use in connection with an automobile or other vehicle and it is an object of the invention to provide a novel and improved electric signaling system embodying a plurality of lamps together with means whereby said lamps may be caused to burn in pairs.

Furthermore it is an object of the invention to provide a novel and improved electric signaling system wherein a pair of lamps is arranged at the forward end of a vehicle and a second pair of lamps arranged at the rear portion of a vehicle together with means whereby each of said pairs may be caused to burn in unison or one independently of the other and whereby each of the lamps comprised in both of the pairs may be caused to burn independently of the other.

The invention consists in the details of construction and in the combination and arrangement of the several parts of my improved electric signal wherein certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood I will now proceed to describe the same with reference to the accompanying drawings wherein is disclosed a diagrammatic view illustrating an electric signaling system constructed in accordance with an embodiment of my invention, the frame or chassis of the vehicle being indicated by dotted lines.

As disclosed in the accompanying drawings C denotes the frame or body of the vehicle with which my improved signaling system is adapted to co-act and which serves as a ground for the electric circuits. A pair of lamps L are arranged at the forward end of the chassis or body and at opposite sides thereof while a second pair of lamps L' are arranged at the rear portion of the body and at opposite sides thereof.

E denotes a source of electrical energy which is grounded through the medium of the conductor $a$. $b$ denotes a conductor extending within the box 1 adapted to be supported upon the dash of a vehicle or at any other suitable point of location which will render the same readily accessible. Electrically connected with the conductor $b$ through the medium of the conductor $c$ are the switches 2, 3, 4 and 5 each of a double contact type. The switch 2 co-acts with a conductor $d$ leading to one of the lamps L and a conductor $e$ leading to one of the lamps L' and arranged at the same side as the first named lamp L. The switch 4 co-acts with a conductor $f$ leading to the second lamp L and with a conductor $g$ leading to the second lamp L'. Each of the lamps L and L' is grounded through the medium of a conductor $h$. When the switch 2 is closed it will be self evident that a lamp L and a lamp L' at one side of the chassis or frame C will be caused to burn and when the switch 4 is closed the remaining two lamps L and L' will be caused to burn. As the switches 2 and 4 are independently operable it will be at once understood that all of the lamps L and L' may be caused to burn in unison by closing both of the switches 2 and 4 or a single set L and L' at one side of the chassis or frame C will be caused to of the chassis or frame C will be caused to burn independently of the lamps L or L' at the opposite side of the chassis or frame.

The switch 3 co-acts with the conductor $j$ leading through one of the lamps L and with a conductor $k$ leading to the second lamp L whereby it will be perceived that when the switch 3 is closed both of the forward lamps L will be caused to burn. The switch 5 co-acts with a conductor $m$ leading to one of the lamps L' and a conductor $n$ leading to the second lamp L' whereby both of said lamps L' will be caused to burn when the switch 5 is closed. In the use of my improved electric signaling system upon an automobile or other vehicle the switch 4 is closed when it is desired to give indication that the vehicle is about to turn to the right as the closing of the switch 4 will cause the lamps L and L' at the right side of a chassis or frame C to burn. When it is desired to give indication of a turn to the left the switch 2 is closed which results in a burning of the lamps L and L' at the left side of the machine. Should it be desired to give indication to vehicles following of danger ahead the switch 5 is closed which results in the burning of the two rear lamps L'. It has also been found of advantage to close the switches 3 and 5 so that all four of the lamps will burn when it is the purpose of the vehicle to continue traveling straight ahead. In order to give indication that the vehicle is being driven by an unauthorized person the switch 3 is closed which results in the burning of the two front lamps L. For this latter indication the lid 2 of the box 1 is closed and locked after the switch 3 has been adjusted to cause the burning of the lamps L so that the possibility of the unauthorized person extinguishing the lamps L is substantially entirely eliminated.

From the foregoing description, it is thought to be obvious that a signaling device constructed in accordance with my invention is particularly well adapted for use by reason of the convenience and facility with which it may be assembled and operated and it will also be obvious that my invention is susceptible of some change and modification without materially departing from the principles and spirit thereof and for this reason I do not wish to be understood as limiting myself to the precise arrangement and formation of the several parts herein shown in carrying out my invention in practice except as hereinafter claimed.

I claim:

An electrical signal system comprising four double contact switches connected with a common source of electrical energy, an electrical conductor connecting a contact of each of the switches with a contact of a second switch, each of said conductors being independent of the other when the switches are opened, a conductor connected with each of the first named conductors and in connection with the source of electrical energy common to the switches and a lamp interposed in each of the last named conductors, said switches being operable to cause the lamps to burn in pairs, or to cause the lamps of one pair and a lamp of a second pair to burn in unison or to make the lamps of both pairs burn in unison.

In testimony whereof I hereunto affix my signature in the presence of two witnesses.

HERBERT JOHN SANDERSON.

Witnesses:
  E. A. Hess,
  W. H. Mendenhall.